H. SMIT.

SURGICAL INSTRUMENT.

APPLICATION FILED NOV. 26, 1919.

Reissued July 20, 1920.

14,923.

2 SHEETS—SHEET 1.

Inventor

Harry Smit

By his Attorney

William Reinhardt

H. SMIT.

SURGICAL INSTRUMENT.

APPLICATION FILED NOV. 26, 1919.

Reissued July 20, 1920.

14,923.

2 SHEETS—SHEET 2.

Inventor

Harry Smit

By his Attorney

William A. Ricard

UNITED STATES PATENT OFFICE.

HARRY SMIT, OF NEW YORK, N. Y.

SURGICAL INSTRUMENT.

14,923. Specification of Reissued Letters Patent. Reissued July 20, 1920.

Original No. 1,293,565, dated February 4, 1919, Serial No. 256,737, filed October 3, 1918. Application for reissue filed November 26, 1919. Serial No. 340,937.

*To all whom it may concern:*

Be it known that I, HARRY SMIT, a subject of the Queen of the Netherlands, residing at New York, in the county of New York and State of New York, have invented certain new and useful Improvements in Surgical Instruments, of which the following is a specification.

This invention relates more particularly to a surgical instrument provided with a needle holder and manipulator and with flesh gripping devices adapted to grip the edges of a wound or cut and properly position such edges with respect to the needle.

The invention has for a general object to provide an instrument whereby the labor of the surgeon when stitching wounds, cuts, incisions or the like is materially lessened, and the pain and inconvenience of the patient greatly reduced.

A further object of the invention is to provide an instrument which will insure a stable holding or positioning of the edges to be stitched with relation to the penetrating needle, and a proper positioning of the skin or flesh holders and the needle, irrespective of any outside influence such as moving of the patient or false movement of the hand of the surgeon.

A further object is to provide an instrument in which the pressure of the clamps which grip the flesh is mechanically applied by means independent of the needle operating means and therefore does not vary during movement of the needle or by reason of varying pressure of the surgeon's hand on the latter, the clamps also providing an abutment for the flesh which prevents the latter moving with the needle, by these features eliminating unnecessary pain and injury.

A further purpose of the invention is the provision of an instrument which may be manipulated solely by one hand, both when applying the same to a wound, cut or like part to be stitched as well as drawing the parts together and during the operation of stitching the same.

A further purpose of the invention is the provision of an instrument embodying a minimum number of parts, the same being of such construction and arrangement to admit of sterilization and thorough cleaning to insure against infection of a cut or wound by the instrument.

The invention also provides an instrument of the character specified to which is attached a receptacle for receiving the spool or bobbin containing the thread whereby the latter is conveniently at hand and prevented from becoming infected or fouled in any manner.

The invention also aims to provide an instrument for the use of any type or make of needle, the latter being detachably fitted to the instrument whereby the work of the surgeon may be facilitated and different types or styles of needle may be used in connection with the one instrument.

The drawing illustrates a preferred embodiment of the invention, however, it is to be understood that in adapting the same to meet different conditions various changes in form, proportion, and details of construction may be resorted to without departing from the invention as defined in the appended claims.

In the drawings:—

Corresponding and like parts are referred to in the following description and indicated in all the views of the drawings by like reference characters.

In the present embodiment of the invention the instrument comprises a pair of main members in the form of arms A and B which cross each other toward their operating ends and are pivotally connected together by means of a rivet or like fastening 1. These arms, A and B are adapted to be gripped at their other ends by the hand of the user and have their gripping ends enlarged and formed with openings to receive a digit of the hand after the fashion of a pair of shears.

Figure 1:
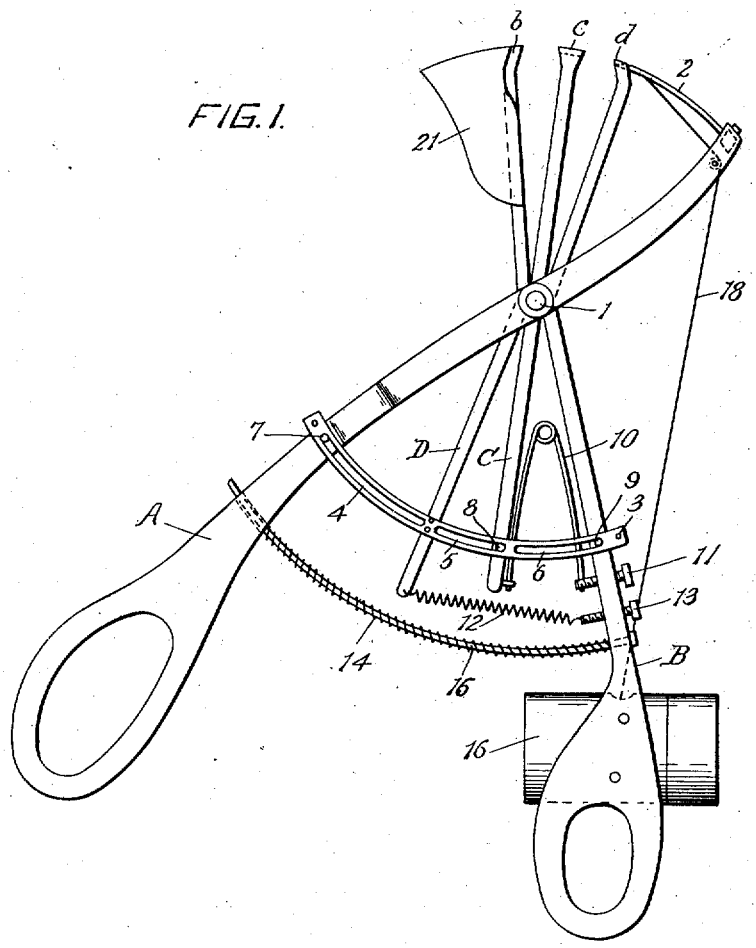
Figure 1 is a view in elevation of an instrument embodying the invention showing the relation of the parts when the several members are separated.
Figure 2:
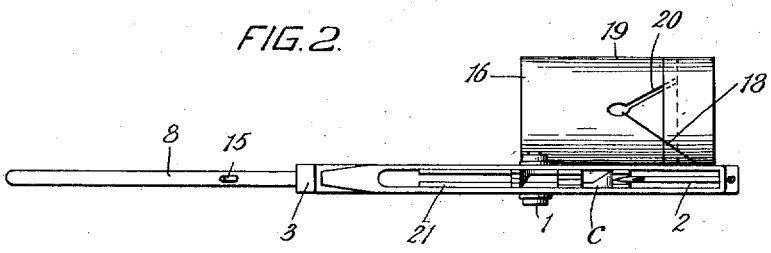
Fig. 2 is a top end view of the instrument as seen when looking down thereon with the parts in position shown in Fig. 1.
Figure 3:
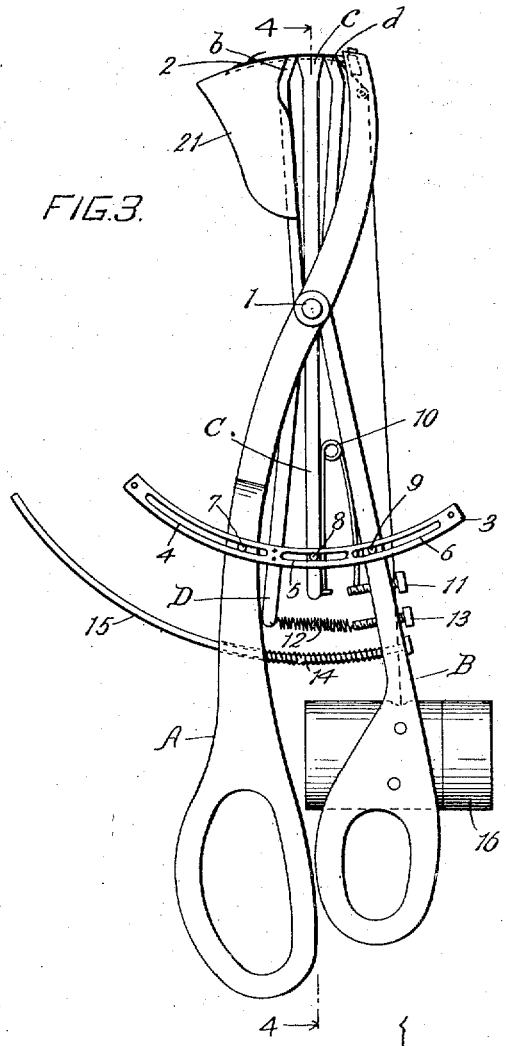
Fig. 3 is an elevation of the instrument with the several members closed together and the needle in the position which it assumes when passed through the parts to be stitched.
Figure 4:
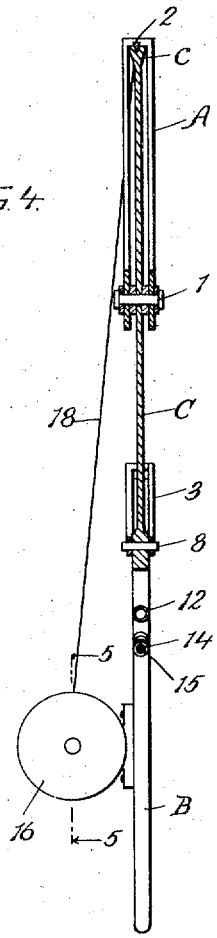
Fig. 4 is a vertical section on the line 4—4 of Fig. 3.
Figure 5:
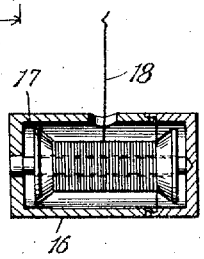
Fig. 5 is a detail sectional view of the holder for the spool or bobbin taken on the line 5—5 of Fig. 4.

Upon the rivet 1 are also pivoted between their ends a pair of swinging clamp bars C and D which also cross each other so as to make opposite ends move outwardly and inwardly in unison, these bars being located intermediate of the main arms A and B as clearly shown in Figs. 1 and 3. The outer ends of the arms A and B and bars C and D project to a like distance from the pivot 1 so as to act jointly in the performance of the required operation.

The outer end *c* of the bar C is flared outwardly on opposite sides to provide a pair of oppositely facing jaw members. The outer end *d* of the bar D is inclined inwardly to provide a jaw coacting with one jaw-face of the end *c*, while the end *b* of the arm B is bent inwardly to provide a jaw coacting with the other jaw-face of the end *c*.

The outer end of arm A carries the needle 2 which projects therefrom toward the arm B and is curved concentric to the pivot 1. The ends *b*, *c* and *d* are also formed concentric to the pivot 1 and are notched to provide clearance for the needle 2. The needle 2 is detachably connected to the arm A to admit of ready application of any make, type or design of needle as may be best suited to the requirements of the surgeon. The needle 2 has the eye near the point whereby the thread is carried through the parts to be stitched as the point of the needle is forced through such parts.

The inner ends of the bars C and D are of less length than the corresponding ends of the arms A and B and the bar D has secured thereto adjacent its inner ends a curved strip 3 which is curved concentrically to the pivot 1 and extends across the arms A and B and the bar C. The strip 3 is provided with the three longitudinal slots 4, 5 and 6 in which engage pins 7, 8 and 9 fixed respectively to the arm A, bar C and arm B, these pins and slots serving to limit the outward movement of the parts as clearly shown in Fig. 1. A spring 10 of V-form is disposed between the inner ends of the bar C and arm B and connected at opposite ends thereto. This spring is of the contractile type and normally tends to draw the ends of the arm B and bar C together so as to close jaw *b* upon jaw *c*. The tension of spring 10 may be regulated by means of a set screw 11 threaded through the arm A.

A contractile helical spring 12 connects the inner end of arm B with the inner end of bar D, the tension of this spring being regulated by means of a set screw 13 threaded through the arm B. It will be apparent that the normal action of these springs is to press the jaws *b* and *d* against opposite sides of the central double jaw *c*.

Disposed between the arms A and B and normally tending to press the latter apart is an expansile spring 14 which is mounted on a curved rod 15 attached at one end to the arm B and having its opposite end pressing freely through an opening formed in the arm A.

A casing 16 is attached to the arm B and is adapted to receive a spool or bobbin 17 containing the thread 18. An opening 19 is found in the side wall of casing 16 and a slot 20 leads from the opening outward and facilitates the threading of the casing when placing the spool or bobbin therein, or when it becomes necessary to pass the thread 18 through the opening 19.

A guard comprising a pair of rearwardly extending side plates 21 is applied to the outer end of the arm B and forms a shield for the needle during and subsequent to the passage of the needle through the part to be stitched. While the guard shields the point of the needle it does not obstruct the vision of the surgeon or the grasping of the thread when the needle has passed through the part to be stitched.

The operation is as follows: Normally the different parts of the instrument rest in the position shown in Fig. 1, the expansion of spring 14 forcing the arms A and B apart. During the initial outward movement of arm A away from arm B the tension of springs 10 and 12 acts to retain bars C and D motionless with respect to arm B. As the arm A continues its outward movement the pin 7 reaches the left hand end of the slot 4 in strip 3 and, since the latter is mounted on bar D, draws bar D outwardly, it being understood that the expansive force of spring 14 is sufficient to overcome the contractile force of springs 10 and 12. As the strip 3 continues moving the right hand end of slot 5 engages pin 8 on bar C and moves the latter outwardly until the right hand end of slot 6 engages the pin 9 on arm B, thus stopping the outward movement of the parts and leaving them in the position shown in Fig. 1 with the jaws *b*, *c* and *d* separated and the point of the needle drawn back.

In using the device the needle is threaded and the handle portions of arms A and B grasped in a well known manner. The jaw *c* is then inserted a slight distance in the wound, cut or incision to insure the jaws *b* and *d* engaging with the skin at the sides thereof.

After the instrument has been thus adjusted the members A and B are pressed together and the parts A, B, C and D reverse the movement just described causing jaws *b* and *d* to close on the twin jaw *c*, thereby gripping the skin and drawing the same together.

A continued closing movement of the arms A and B causes the needle 2 to pass through the edges of the skin which are thus stitched, the slot 4 being so proportioned in length as to cause the jaws to close together before the needle 2 makes any advance relatively to the jaw *d*.

Upon relaxing the arms A and B the thread carried through the skin is slackened, thereby enabling the surgeon to grasp the thread with a pair of forceps or other instrument so as to draw the end of the thread therethrough. The end of the thread is held during the withdrawal of the needle after a portion of the thread is cut in advance of the needle so as to leave ends of sufficient length to be knotted in the manner well understood. By using a needle with a notch or open eye instead of the usual closed eye, the stitching will be continuous as will be readily understood.

As will be apparent my improved instrument may be manipulated with one hand to grip and hold the edges of the wound or incision and pass the needle therethrough, the clamping of the edges and penetration of the needle being performed in one continuous motion while the pressure of the clamps on the flesh is regulated entirely by the springs 10 and 12 and is entirely independent of the pressure on the arms A and B the handle portions of the latter coming together to prevent further closing movement before the needle carrying end of arm A, moves into contact with the jaw *d*, as will be apparent from Fig. 3 of the drawings.

Having thus fully described my invention, what I claim as new and desire to secure by Letters Patent is:—

1. In a surgical instrument of the character specified, main members pivotally connected, an intermediate pivoted member, connecting means between the intermediate member and one of the main members to limit the relative movement of the members in one direction, and a spring connection between the intermediate members and one of the main members.

2. In a surgical instrument, main members pivotally connected, intermediate pivoted members, and a spring between each of the intermediate members and one of the main members.

3. In a surgical instrument of the character specified, pivoted main members, pivoted intermediate members, a bar having connection with one of the intermediate members, and a limited play with reference to the remaining intermediate member and the main members, and a spring between each of the intermediate members and one of the main members.

4. A surgical instrument of the character specified, comprising main members pivotally connected, intermediate pivoted members, a bar attached to one of the intermediate members, a pin and slot connection between said bar and the remaining intermediate member and each of the main members, and a spring between each of the intermediate members and one of the main members.

5. A surgical instrument of the character specified, comprising main members pivotally connected near one of their ends, intermediate members of a less length than the main members and pivoted co-axially therewith, the outer ends of the several members projecting to an equal distance, a curved bar attached to one of the intermediate members and having a pin and slot connection with the remaining intermediate member and with each of the main members, and a spring between each of the intermediate members and one of the main members.

6. A surgical instrument of the character specified, comprising main members pivotally connected near one of their ends, intermediate members of a less length than the main members and pivoted co-axially therewith, the outer ends of the several members projecting to an equal distance, a curved bar attached to one of the intermediate members and having a pin and slot connection with the remaining intermediate member and with each of the main members, a spring between each of the intermediate members and one of the main members, and means for adjusting the tension of each of the springs.

7. A surgical instrument of the character specified, comprising main members pivotally connected, intermediate members pivoted co-axially with the main members, one of the intermediate members having its outer end expansible to form a twin jaw, and the adjacent ends of the main and intermediate members being bent to provide jaws to co-act with the elements of the twin jaw, a bar attached to one of the intermediate members and having a pin and slot connection with the remaining intermediate member and with each of the main members, and a spring between each of the intermediate members and one of the main members.

8. A surgical instrument comprising pivoted main members, a needle at the outer end of one of the members, a guard at the outer end of the remaining member, intermediate members pivoted co-axially with the main members, a curved bar attached to one of the intermediate members and having a pin and slot connection with the remaining intermediate member and with each of the main members, and a spring between each of the intermediate members and one of the main members.

9. The herein described surgical instrument, comprising main members crossing and pivoted at the point of crossing, the handle ends of such members having openings to receive digits of the hand, a needle removably fitted to the outer end of one of the members, a guard at the outer end of the remaining member, a thread holder mounted upon one of the members, a curved rod and expansible helical spring between the handle ends of the members, intermediate members of less length than the main members and pivoted coaxially therewith, a curved bar attached to one of the intermediate members and having a pin and slot connection with the remaining intermediate members and with each of the main members, a spring between each of the intermediate members and one of the main members, and means for adjusting the tension of the springs.

10. In a surgical instrument, flesh gripping means, a needle driver, and a common operating mechanism for said flesh gripping means and said needle driver.

11. In a surgical instrument, flesh gripping means, a needle driver, and a common operating mechanism for said flesh gripping means and said needle driver, said mechanism being adapted to first cause the flesh gripping means to act prior to engagement of the needle with the flesh.

12. In a surgical instrument, a pair of arms movable toward and away from one another, a gripping clamp jaw carried upon one of said arms, one of said arms being adapted to carry a needle, a second gripping clamp jaw arranged intermediate of the said arms, and means acting to cause said second jaw to automatically move toward said first jaw when the said arms are moved toward one another.

13. In a surgical instrument, a compound clamp adapted to grip both edges of a cut or wound, a needle driver, and a common operating mechanism for said clamp and needle driver.

14. In a surgical instrument, a compound clamp adapted to grip both edges of a cut or wound, an arm on which one of the clamp jaws is mounted, a second arm adapted to carry a needle, and means whereby said clamp is caused to grip the edges of the wound prior to the forward movement of the needle relatively to the adjacent arm of the clamp.

15. In a surgical instrument, a compound clamp adapted to grip both edges of a cut or wound, an arm on which one of the clamp jaws is mounted, a second arm adapted to carry a needle, and means whereby a movement of the second arm to operate the needle causes the said clamp to grip the edges of the wound, said means applying pressure to the clamp independently of the pressure on the said arm.

16. In a surgical instrument, flesh gripping means, a needle driver, and means acting automatically with the needle driver to apply pressure to the flesh gripping means.

17. In a surgical instrument, flesh gripping means a needle driver, and means acting automatically with the needle driver to apply pressure to the flesh gripping means, said pressure applying means being unaffected by varying pressure on the needle driver.

18. In a surgical instrument, a pair of relatively movable arms one of which is adapted to carry a needle and the other a clamp jaw, additional clamp jaws located intermediate of said arms, springs tending to move said additional clamp jaws toward the first mentioned clamp jaw and toward each other, and means whereby said additional clamp jaws are moved away from said first jaw and from each other by movement of the two arms away from one another.

19. In a surgical instrument, a pair of relatively movable arms one of which is adapted to carry a needle and the other a clamp jaw, additional clamp jaws located intermediate of said arms, springs tending to move said additional clamp jaws toward the first mentioned clamp jaw and toward each other, and means whereby said additional clamp jaws are moved away from said first jaw and from each other by movement of the two arms away from one another, said means comprising a bar fixed on one of the said additional clamp members, and having a lost motion connection with the other member and the two arms.

20. In a surgical instrument, a pair of arms one of which is adapted to carry a needle and the other to form an abutment for the flesh to be penetrated, and a shield consisting of a pair of side plates projecting rearwardly from the last mentioned arm.

21. In a surgical instrument, a pair of arms one of which is adapted to carry a needle and the other to present a clamp jaw, additional clamp members intermediate the said arms, and means whereby movement of the arms first causes the clamp members and jaw to close upon the flesh and then the needle to penetrate the latter.

22. In a surgical instrument, an intermediate clamp jaw, a pair of side clamp jaws movable toward and away from said intermediate jaw, and means providing an operative connection between said side clamp jaws whereby the latter may be operated in unison.

23. In a surgical instrument, an intermediate clamp jaw, a pair of side clamp jaws movable toward and away from said intermediate jaw, and means whereby said side clamp jaws may be operated in unison, said means including a pair of handle members upon one of which one of the said side clamp jaws is mounted, means whereby movement of said handle members moves the intermediate clamp jaw and the other side clamp jaw away from the first mentioned jaw.

24. In a surgical instrument, an intermediate clamp jaw, a pair of side clamp jaws movable toward and away from said intermediate jaw, and means whereby said side clamp jaws may be operated in unison, said means including a pair of handle members upon one of which one of the said side clamp jaws is mounted, means whereby movement of said handle members moves the intermediate clamp jaw and the other side clamp jaw away from the first mentioned jaw and springs normally urging said intermediate clamp jaw and last mentioned side clamp jaw toward the other side clamp jaw.

25. In a surgical instrument, an intermediate clamp jaw, a pair of side clamp jaws movable toward and away from said intermediate jaw, a pair of handle members upon one of which one of the said side clamp jaws is mounted, and means including a slotted bar whereby movement of said handle members moves the intermediate clamp jaw and the other side clamp jaw away from the first mentioned jaw.

26. In a surgical instrument, an intermediate clamp jaw, a pair of side clamp jaws movable toward and away from said intermediate jaw, a pair of handle members upon one of which one of the said side clamp jaws is mounted, and means including a slotted bar whereby movement of said handle members moves the intermediate clamp jaw and the other side clamp jaw away from the first mentioned jaw and springs connected at opposite ends to said handle and said side and intermediate clamp jaw and normally acting to close said jaws upon one another.

27. In a surgical instrument, an intermediate clamp jaw, a pair of side clamp jaws movable toward and away from said intermediate jaw, a pair of handle members upon one of which one of the said side clamp jaws is mounted, and means including a slotted bar whereby movement of said handle members moves the intermediate clamp jaw and the other side clamp jaw away from the first mentioned jaw and springs connected at opposite ends to said handle and said side and intermediate clamp jaw and normally acting to close said jaws upon one another and a third spring of greater strength than the combined strength of the first mentioned springs normally urging said handle members away from one another.

28. In a surgical instrument, an intermediate clamp jaw, a pair of side clamp jaws movable toward and away from said intermediate jaw, a pair of handle members upon one of which one of the said side clamp jaws is mounted, and means including a slotted bar whereby movement of said handle members moves the intermediate clamp jaw and the other side clamp jaw away from the first mentioned jaw and springs connected at opposite ends to said handle and said side and intermediate clamp jaw and normally acting to close said jaws upon one another and a third spring of greater strength than the combined strength of the first mentioned springs normally urging said handle members away from one another said slotted bar being adapted to limit movement of said members under the influence of said spring.

13 November, 1919.

HARRY SMIT.

Witnesses:
MILTON I. MASSON,
MARY C. FLICKER.